United States Patent
Shinozaki et al.

[11] Patent Number: 5,956,214
[45] Date of Patent: Sep. 21, 1999

[54] MAGNETIC HEAD DRIVE MECHANISM IN PHOTO-ELECTRO-MAGNETIC DISK DRIVE DEVICE

[75] Inventors: Shimpei Shinozaki; Suguru Takishima, both of Tokyo, Japan

[73] Assignee: Asahi Kogaku Kogyo Kabushiki Kaisha, Tokyo, Japan

[21] Appl. No.: 08/998,977

[22] Filed: Dec. 29, 1997

[30] Foreign Application Priority Data

Dec. 27, 1996 [JP] Japan ................................ 8-349741

[51] Int. Cl.⁶ .................................................. G11B 21/22
[52] U.S. Cl. ........................................................ 360/105
[58] Field of Search ................................. 360/104–106; 369/244, 249

[56] References Cited

U.S. PATENT DOCUMENTS

| | | | |
|---|---|---|---|
| 4,520,473 | 5/1985 | Sugiyama et al. | 369/249 X |
| 5,008,876 | 4/1991 | Nakagishi | 369/244 |
| 5,210,739 | 5/1993 | Nakagishi | 369/244 |
| 5,243,591 | 9/1993 | Mogamiya | 369/244 |
| 5,564,585 | 10/1996 | Saitoh | 220/241 |
| 5,617,404 | 4/1997 | Okada | 369/244 |
| 5,677,897 | 10/1997 | Anada et al. | 369/244 X |
| 5,751,518 | 5/1998 | Konno et al. | 360/104 |

FOREIGN PATENT DOCUMENTS 6-43871  6/1994  Japan .

*Primary Examiner*—John H. Wolff
*Attorney, Agent, or Firm*—Greenblum & Bernstein, P.L.C.

[57] ABSTRACT

A magnetic head drive mechanism in a photo-electro-magnetic disk drive is so designed that a magnetic head is coupled to the end portion of a swingable arm, and, as a photo-electro-magnetic disk is loaded or unloaded, the arm is swung, to move the magnetic head towards or away from the surface of the photo-electro-magnetic disk. In the magnetic head drive mechanism, pins are provided on both sides of the magnetic head, respectively, and a first engaging groove which is engaged with the pin and a second engaging groove which is engaged with the pin are provided on both sides of the opening of a cartridge head, respectively, whereby, at the unloading time both sides of the magnetic head are locked; that is, the vibration of the magnetic head is prevented during the transportation.

12 Claims, 10 Drawing Sheets

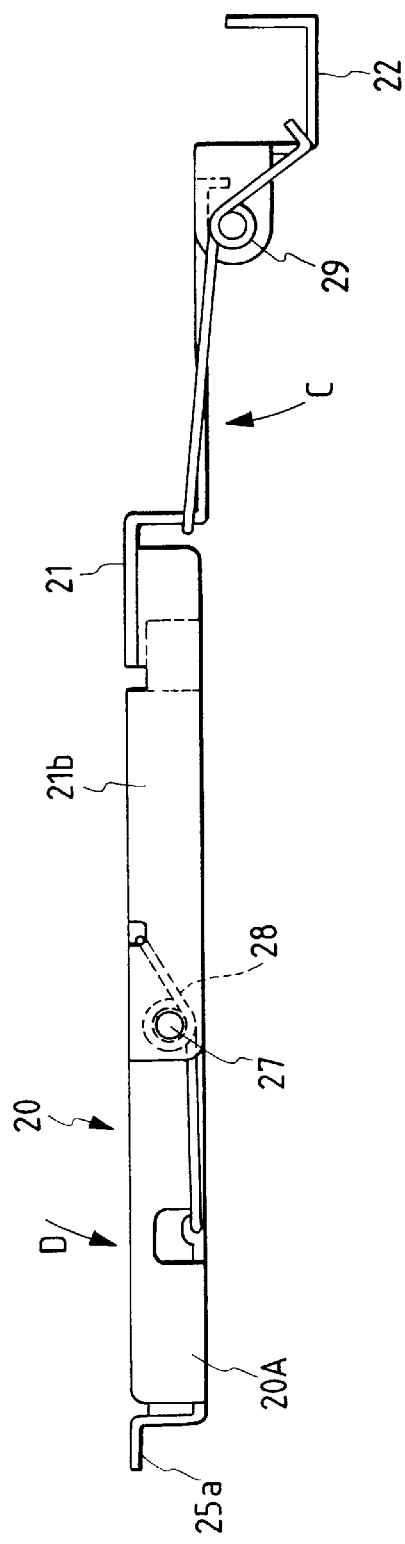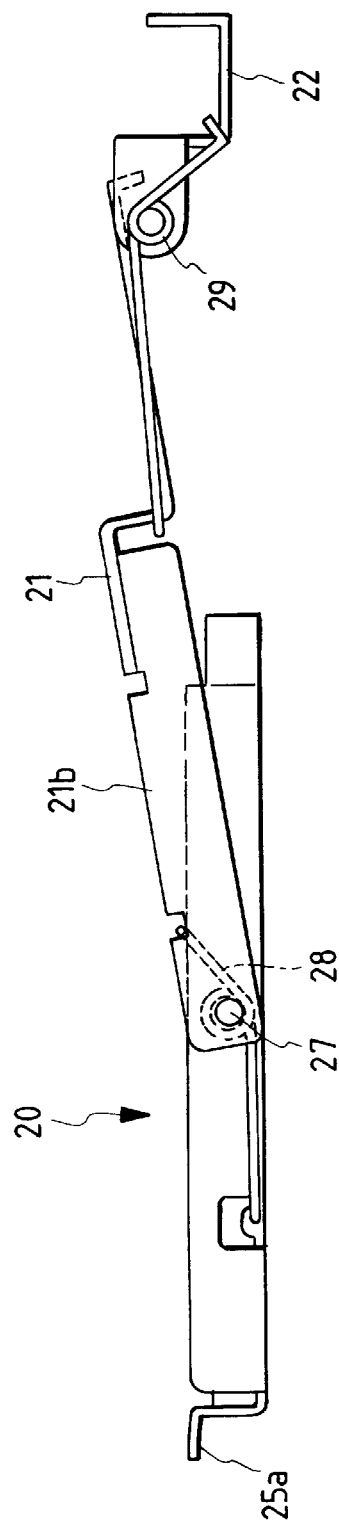

MAGNETIC HEAD DRIVE MECHANISM IN PHOTO-ELECTRO-MAGNETIC DISK DRIVE DEVICE

BACKGROUND OF THE INVENTION a) Field of the Invention

This invention relates to a photo-electro-magnetic disk drive device, and more particularly to a magnetic head driver mechanism in which an arm is swung in association with a disk loading or unloading operation, so that a magnetic head on the end of the arm is moved towards and away from a photo-electro-magnetic disk.

b) Discussion of Background Information

In a photo-electro-magnetic disk drive device developed by the present inventors, a photo-electro-magnetic disk is driven as follows: The disk cartridge is inserted into the cartridge holder, and the latter is driven from the unloading position to the loading position, as a result of which the photo-electro-magnetic disk accommodated in the disk cartridge is set on the spindle motor and turned.

Data can be written in the photo-electro-magnetic disk accommodated in the disk cartridge. In this operation, it is necessary to apply a biasing magnetic field to the data recording surface of the photo-electro-magnetic disk. For this purpose, the photo-electro-magnetic disk drive device has a magnetic head. The magnetic head comprises an elliptic coil, and a movable magnet built in the head.

When a disk cartridge is inserted into the cartridge holder, the magnetic head is retracted from the path of conveyance of the disk cartridge so that the head does not obstruct the insertion of the disk cartridge. Furthermore, the coil and the movable magnet of the magnetic head are so supported in the photo-electro-magnetic disk drive device that, when the disk cartridge is at the loading position, they enter the disk cartridge to approach the photo-electro-magnetic disk.

In the conventional photo-electro-magnetic disk drive device, the magnetic head has a pin on only one side. At the unloading time, the pin is engaged with an engaging groove of the cartridge holder, to fix the magnetic head to the cartridge holder.

That is, in the photo-electro-magnetic disk drive, only one side of the magnetic head is fixed. Hence, during when the photo-electro-magnetic disk drive is transported or carried, the magnetic head is greatly vibrated, so that an excessively great force acts on the cartridge holder through the pin, whereby the cartridge holder may be deformed.

SUMMARY OF THE INVENTION

An object of the invention is to provide a magnetic head drive mechanism in a photo-electro-magnetic disk drive device in which the difficulty is eliminated that an excessively great force acts on the cartridge holder during the transportation, thereby to prevent the deformation of the cartridge holder.

In order to achieve the foregoing object of the invention, provided is a magnetic head drive mechanism in a photo-electro-magnetic drive device in which a magnetic head is coupled to the end portion of a swingable arm, and as a photo-electro-magnetic disk is loaded or unloaded, the arm is swung in a plane perpendicular to the photo-electro-magnetic disk, to move the magnetic head towards or away from the surface of the photo-electro-magnetic disk; which, according to the invention, comprises:

locking means which, at the unloading time that the arm is moved away from the surface of the photo-electro-magnetic disk, locks both sides of the vibration surface of the front end portion of the arm, to suppress the vibration of the magnetic head.

With the above-described mechanism, at the unloading time, the locking means locks both sides of the vibration surface of the front end portion of the arm, so that, when the disk is moved, the magnetic head is prevented from being greatly vibrated. Even if the magnet head is vibrated, the force of the magnetic head acting on the locking means is dispersed, and therefore the deformation of the locking means is prevented.

Concretely stated, it is preferable that the locking means comprises first and second engaging grooves which are provided on a cartridge holder which moves a photo-electro-magnetic disk when the disk is loaded or unloaded, and are engaged with first and second pins, respectively, which are provided on both sides of the front end portion of the arm; or it comprises an engaging groove which is formed in a cartridge holder which moves a photo-electro-magnetic disk when the disk is loaded or unloaded, and is engaged with one of two pins which are provided on both sides of the front end portion of the arm; and a hook member which is formed on said cartridge holder, and is engaged with the other pin.

Furthermore, in the mechanism, the locking means unlocks both sides of the front end portion of the arm when a disk unloading operation is shifted to a disk loading operation. This feature allows the magnetic head to readily approach the surface of the photo-electro-magnetic disk.

BRIEF DESCRIPTION OF THE DRAWINGS

FIG. 5 is a side view of the magnetic head, and the magnetic head supporting mechanism at the unloading time.

FIG. 6 is a side view of the magnetic head, and the magnetic head supporting mechanism at the loading time.

The present disclosure relates to the subject matter contained in Japanese patent application No. 8-349741 filed on Dec. 27, 1996, which is expressly incorporated herein by reference in its entirety.

DETAILED DESCRIPTION OF THE PREFERRED EMBODIMENTS

Preferred embodiments of the invention will be described with reference to the accompanying drawings.

Figure 3:
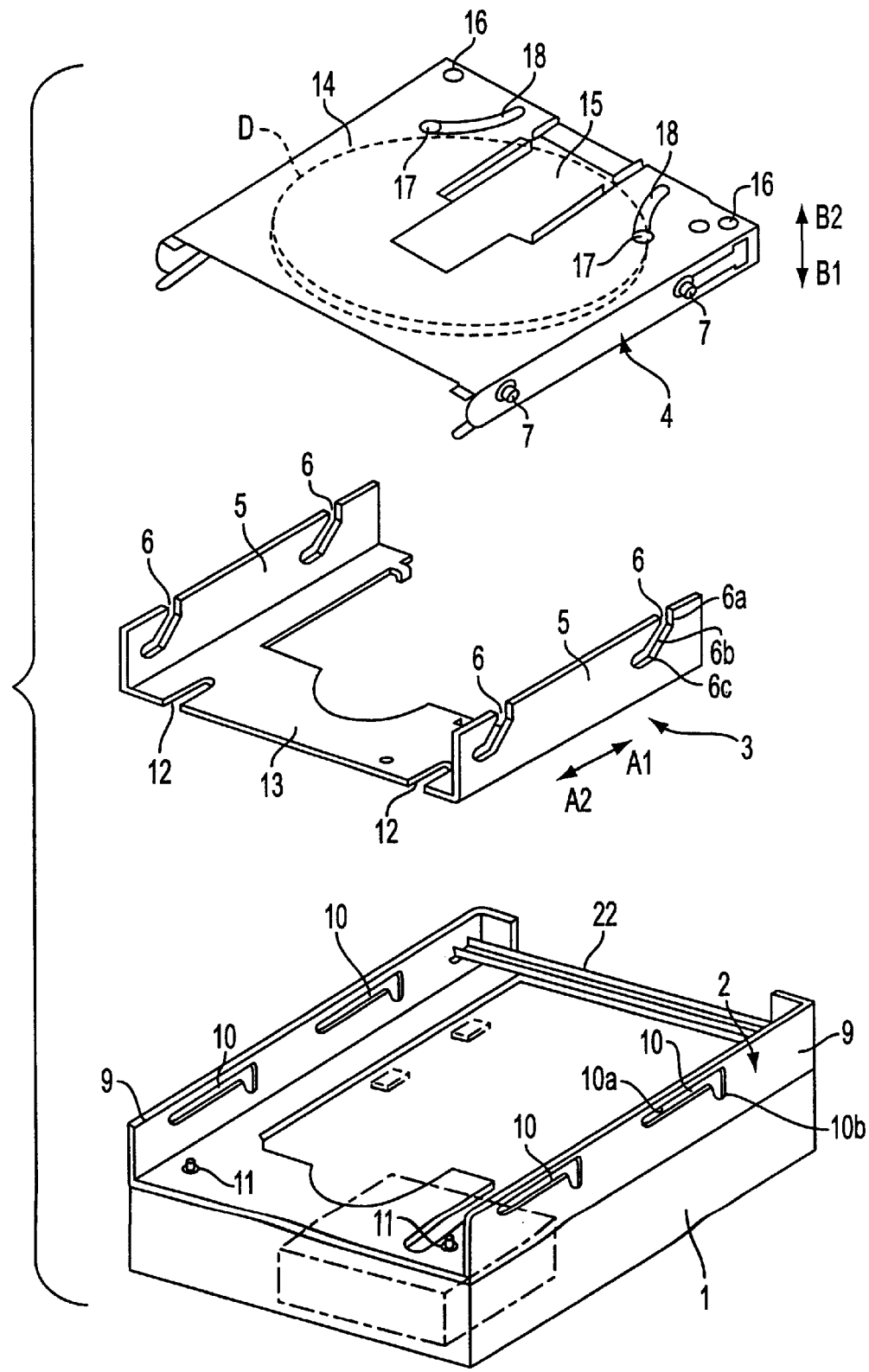
FIG. 3 is an exploded, perspective view showing a loading mechanism in the photo-electro-magnetic disk drive device.

FIG. 3 is an exploded perspective view showing a loading mechanism in a photo-electro-magnetic disk drive device. A photo-electro-magnetic disk is one kind of read/write media, which may be removable from the drive device, as in the embodiments described herein. Roughly stated, the loading mechanism, as shown in FIG. 3, comprises: a base unit 1; a stationary cam plate 2 which is fixedly mounted on the base unit 1; a slide cam plate 3 which is slidable in the directions of the arrows A1 and A2; and a cartridge holder 4 which holds a disk cartridge accommodating a photo-electromagnetic disk D and is movable in the directions of the arrows A1 and A2 and in the directions of the arrows B1 and B2. The base unit 1 includes a section indicated by two-dot chain lines which accommodates a drive unit (not shown) to drive the slide cam 3.

The slide cam 3 has a pair of right and left side plates 5 and 5 each of which has a pair of cam grooves 6 and 6. Each of the cam grooves 6 is made up of a vertical cam groove 6a which is vertically extended, an inclined cam groove 6b which is extended from the vertical cam groove 6a in such a manner that it is inclined with respect to the vertical cam groove 6a, and a bottom (horizontal) cam groove 6c which is extended horizontally from the inclined cam groove 6b. The cartridge holder 4 has a pair of side plates each of which has a pair of cam followers 7 and 7 on its outer surface. The stationary cam plate 2 has a pair of right and left side plates 9 and 9 each of which has a pair of guide grooves 10 and 10. Each of the guide grooves 10 is substantially L-shaped, and is made up of a horizontal groove 10a which is extended in the direction of insertion (i.e., in the direction of the arrow A1), and a vertical groove 10b. The cam followers 7 are slidably engaged with the cam grooves 6 and the guide grooves 10. The stationary cam plate 2 has guide protrusions 11, and the slide cam plate 3 has a pair of guide grooves 12, so that the slide cam plate 3 is slid on the stationary cam plate 2 with the guide grooves 12 being guided by the guide protrusions 11.

When the disk cartridge is inserted into the cartridge holder 4, the slide cam plate 3 is moved in the direction of the arrow A1, whereby the cam walls of the vertical cams 6a push the cam followers 7 to be moved in the direction of the arrow A1 along the horizontal grooves 10a. When the cam followers 7 reach the ends of the horizontal grooves 10a as viewed in the direction of the arrow A1, the cam followers 7 are moved downwardly along the vertical grooves 10b in the direction of the arrow B1 with the aid of the cam walls of the inclined cam grooves 6b, and then reach the lower ends of the vertical grooves 10b with the aid of the bottom cam grooves 6c. Thus, the disk cartridge has been set at the loading position to write or read data.

When the slide cam plate 3 is moved (returned) in the direction of the arrow A2, the cam followers 7 are moved vertically upwardly along the vertical grooves 10b in the direction of the arrow B2. When the cam followers 7 reach the upper ends of the vertical grooves 10b, the cam followers 7, being pushed by the cam walls of the vertical cams 6a, are moved along the horizontal grooves 10a in the direction of the arrow A2 until they reach the ends of the horizontal grooves 10a as viewed in the direction of the arrow A2.

Thus, the disk cartridge is set at the unloading position (discharging position) which is projected a certain amount outwardly from the inserting inlet.

The cartridge holder 4 includes an upper plate 14 between the aforementioned pair of right and left side plates. The upper plate 14 has an opening (window) 15 in which the magnetic head 20 is located. When a disk cartridge is inserted into the cartridge holder 4, the shutter of the disk cartridge is opened, and surface of the photo-electromagnetic disk D (shown in FIGS. 1, 2, and 3 in the disk cartridge is set at the opening 15.

A pair of supporting shafts 16 and 16 are provided at corners of the cartridge holder 4, and in the cartridge holder 4 a pair of swing arms (not shown) are provided which are swingable about the supporting shafts 16 and 16. The aforementioned swing arms (not shown) have guide pins 17 and 17 at the middles thereof, respectively, and those guide pins 17 and 17 are movably engaged with a pair of arcuate guide grooves 18 and 18, respectively, which are formed in the upper plate 14. That is, the swing arms are so designed as to open and close the shutter of a disk cartridge.

Now, the magnetic head 20 which confronts the opening 15, and a supporting mechanism for supporting the magnetic head 20, will be described in detail.

Figure 1:
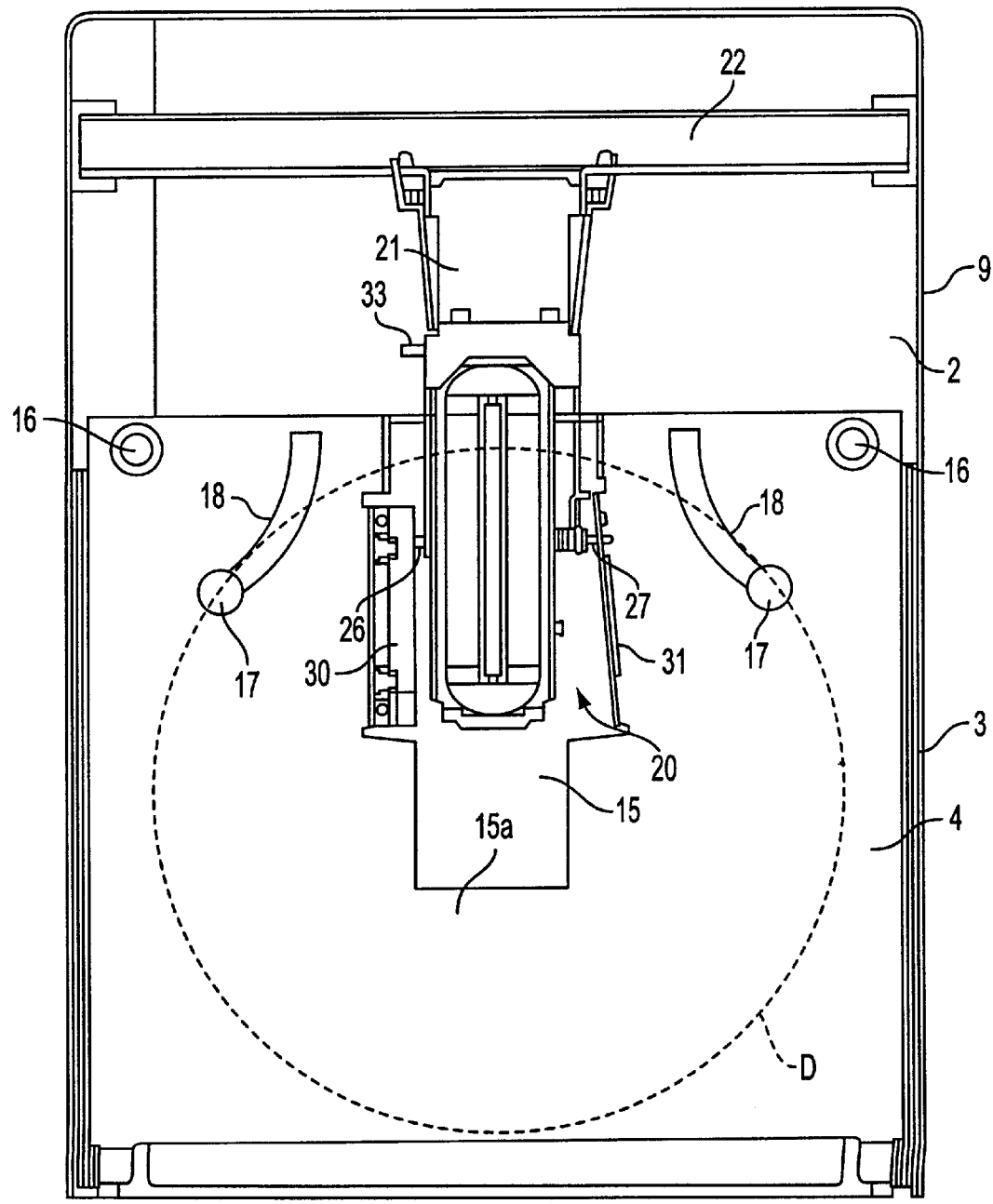
FIG. 1 is a top view of essential components of a photo-electro-magnetic disk drive device, which constitutes a first embodiment of the invention which is in an unloading state.
Figure 2:
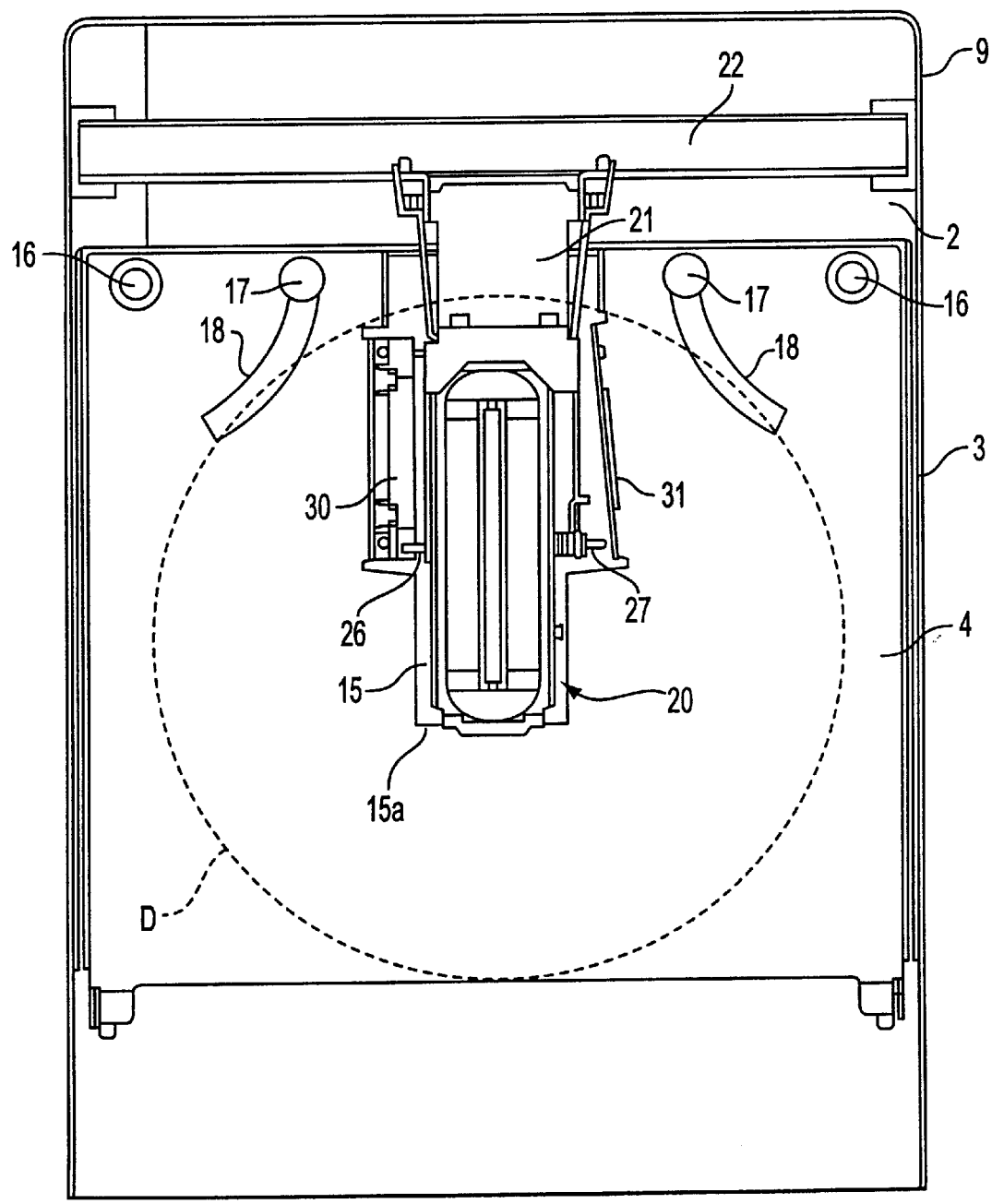
FIG. 2 is a top view of essential components of the photo-electro-magnetic disk drive device which is in an loading state.

FIGS. 1 and 2 shows the magnetic head 20 mounted on the loading mechanism which has been described with reference to FIG. 3. FIG. 1 shows a state of the magnetic head 20 at the unloading time, and FIG. 2 shows a state of the magnetic head 20 at the loading time. As shown in FIGS. 1 and 2, the magnetic head 20 is coupled through a plate-shaped arm 21 to a beam 22. Both ends of the beam 22 are secured to the side plates 9 of the stationary cam plate 2. The position of the disk D is also shown in FIGS. 1 and 2.

At the unloading time, as shown in FIG. 1, the slide cam plate 3 and the cartridge holder 4 are located away from the beam 22, and the position of the magnetic head 20 is not coincident with that of the opening 15. On the other hand, at the loading time, as shown in FIG. 2, the slide cam plate 3 and the cartridge holder 4 come near the bear 22, and the position of the magnetic head 20 is coincident with that of the opening 15.

Figure 4:
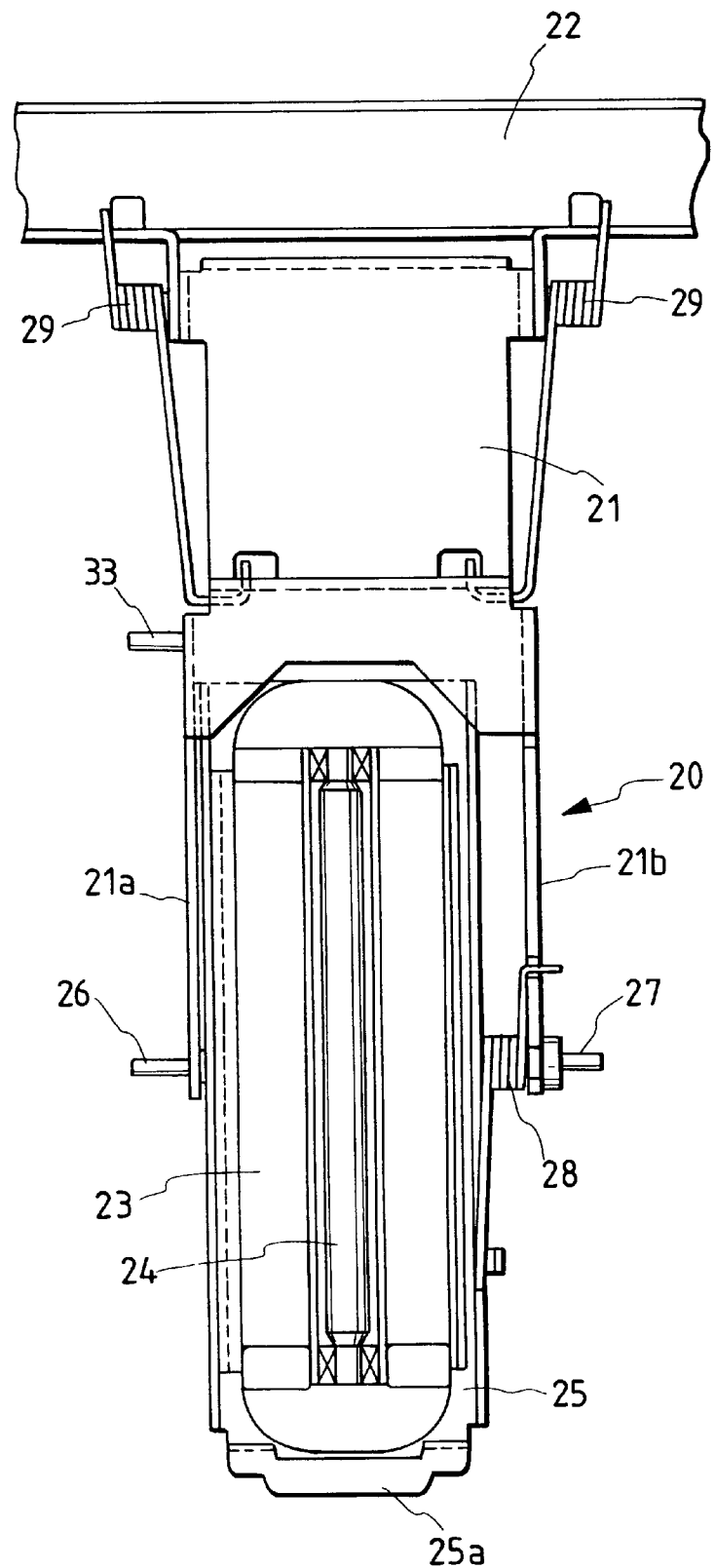
FIG. 4 is a top view of a magnetic head, and a magnetic head supporting mechanism.

FIGS. 4 through 6 show the arrangement of the magnetic head 20, the plate-shaped arm 21, and the beam 22 in detail. FIG. 4 is a top view, and FIGS. 5 and 6 are right side views of those components shown in FIG. 4. More specifically, FIG. 5 shows a state of the components at the unloading time, and FIG. 6 shows a state of the components at the loading time.

The magnetic head 20 comprises: an elliptic coil 23; a movable magnet 24 provided at the center of the coil 23; and a frame 25 which supports the coil 23 and the movable magnet 24. The frame 25 has a pair of pins 26 and 27 on both outer sides at the middle. A coil spring 28 is mounted on the pin 27.

The plate-shaped arm 21 is swingably coupled to the beam 22, and has two coil springs 29 and 29 near its base so that the arm 21 is urged in the direction of the arrow C (cf. FIG. 5) by the coil springs 29 and 29. In addition, a stopper (not shown) is provided which, when the plate-shaped arm 21, being urged in the direction of the arrow C, is swung in the same direction, sets the amount of swing to a predetermined value, whereby at the unloading time the plate-shaped arm 21 is held horizontal as shown in FIG. 5.

The front end portion of the plate-shaped arm 21 branches into a pair of end arms 21a and 21b. The aforementioned pin 26 penetrates the end arm 21a, while the pin 27 penetrates the end arm 21b, so that the magnetic head is swingably supported by the plate-shaped arm 21.

As was described above, the coil spring 28 is mounted on the second pin 27, so that the magnetic head 20 is kept urged in the direction of the arrow D (cf. FIG. 5) at all times. At the unloading time, a part of the frame 25 of the magnetic head 20 strikes against a stopper (not shown) formed on the end arm 21a, so that the magnetic head 20 is held horizontal as shown in FIG. 5. At the loading time, the front end portion 25a of the frame 25 is abutted against the front edge 15a of the opening 15 of the cartridge holder 4 (see FIG. 2), so that the magnetic head 20 is held horizontal as shown in FIG. 6.

Figure 7:
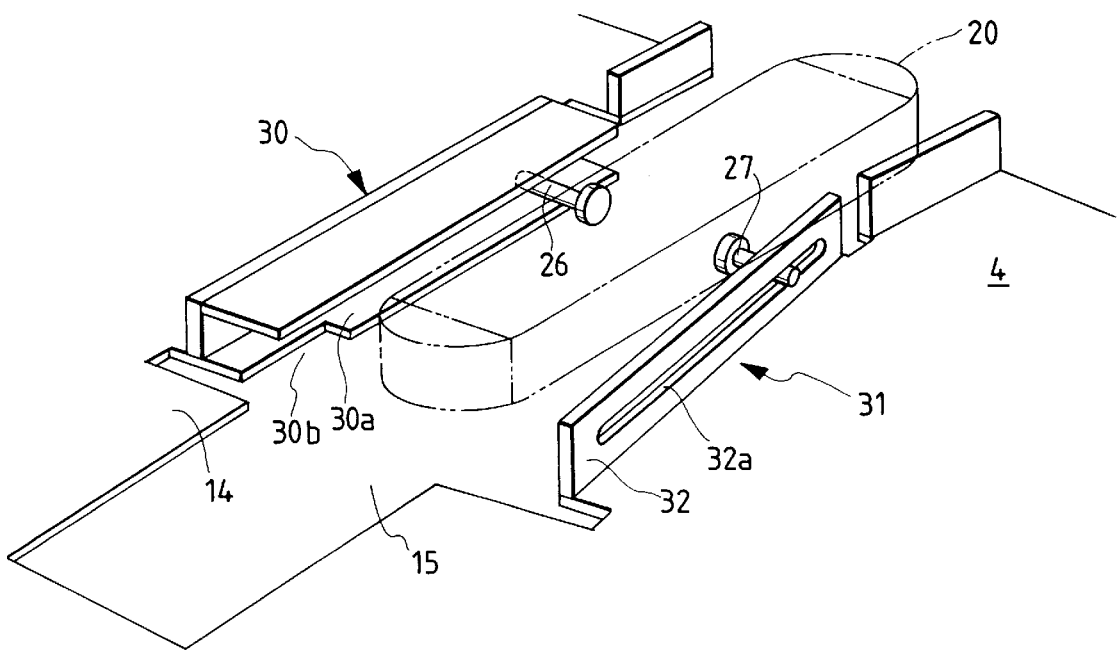
FIG. 7 is a perspective view of a magnetic head locking mechanism.

A specific feature of the embodiment resides in that the pins 26 and 27 (e.g., first and second pins, or, alternatively, first and second engagement portions) are provided on both sides of the magnetic head 20, and at the unloading time the pins 26 and 27 are locked to the cartridge holder 4. In this connection, a first engaging groove 30 (e.g., a third engagement portion) with which the pin 26 is engaged, and a second engaging groove 31 (e.g., a fourth engagement portion) with which the pin 27 is engaged, are provided on both sides of the opening 15 of the cartridge holder 4 as shown in FIG. 7. The first engaging groove 30 is U-shaped in cross section, and is opened towards the opening 15; that is, it may be called a U-shaped groove 30a. One side wall of the U-shaped groove 30a, which is a part of the upper plate 14 of the cartridge holder 4, has a cut (space) 30b which is a part of the opening 15. The second engaging groove is a slit groove 32a formed in an L-section 32 which is formed by bending a part of the flat plate of the cartridge holder 4. The aforementioned pin 27 is engaged with the slit groove 32a.

Figure 8:
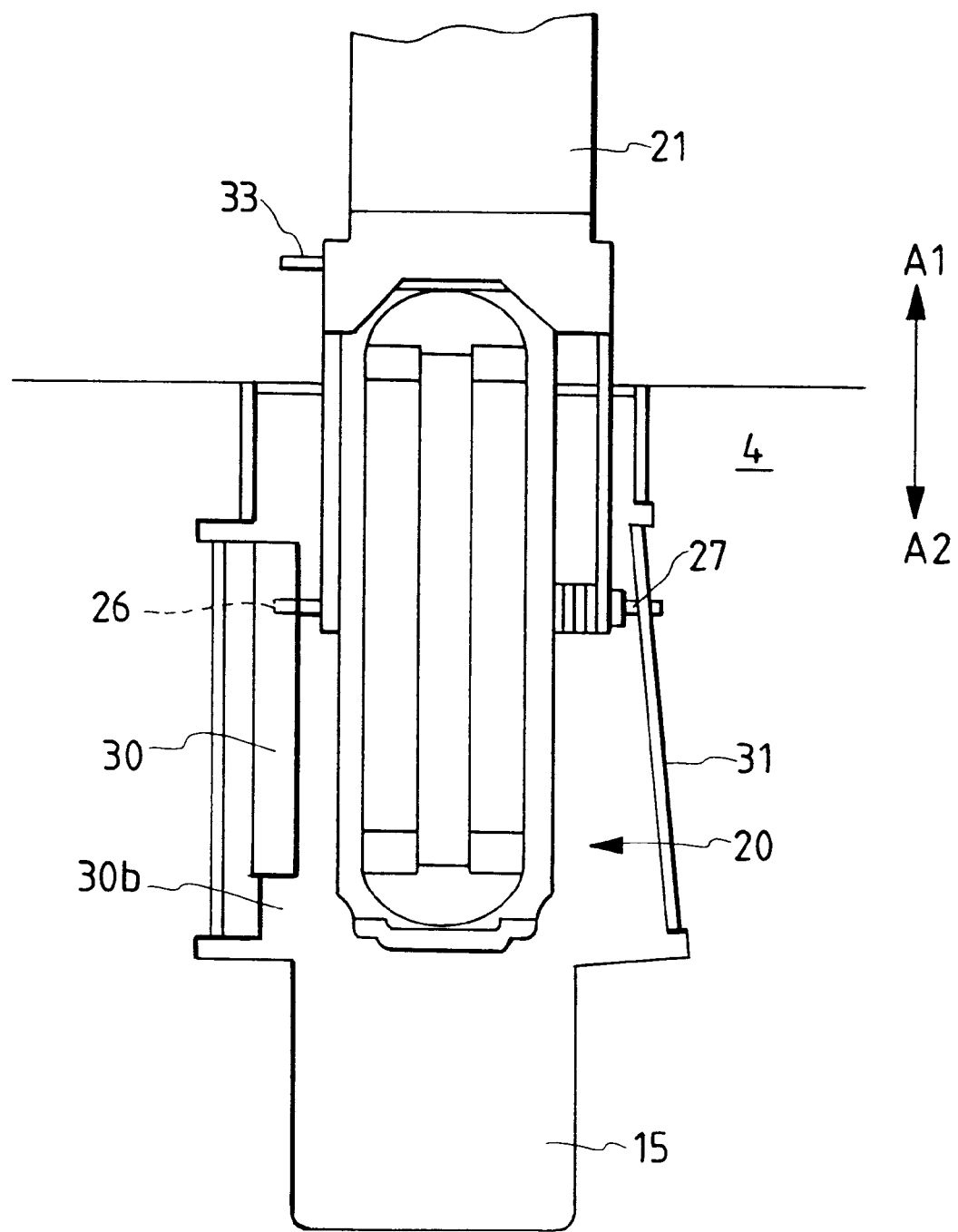
FIG. 8 is a top view of the magnetic head and the cartridge holder at the unloading time.
Figure 9:
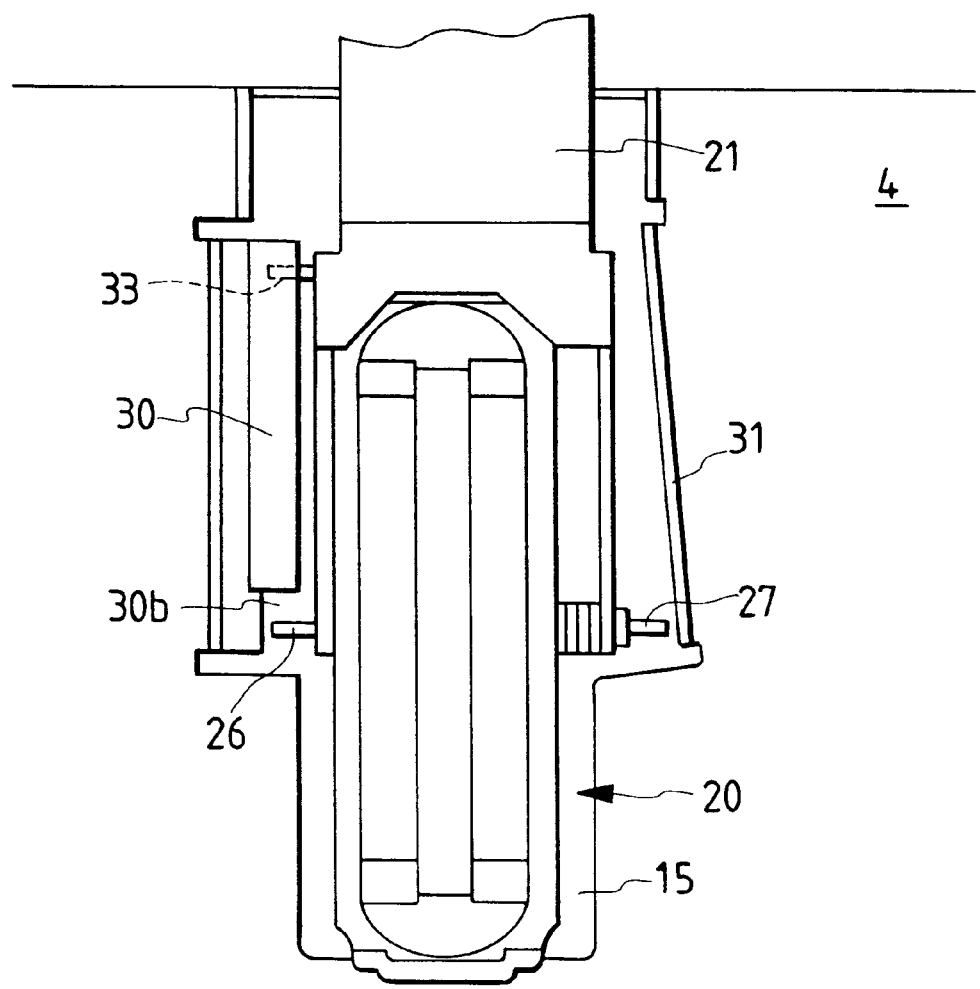
FIG. 9 is a top view of the magnetic head and the cartridge holder at the loading time.

FIGS. 8 and 9 show the magnetic head 20 and the opening 15 of the cartridge holder 4 in detail. FIG. 8 shows a state of the magnetic head 20 at the unloading time, and FIG. 9 shows a state of the magnetic head 20 at the loading time. The cartridge holder moves in a first direction from the unloading position to the intermediate position, and in a second direction from the intermediate position to the loading position. As shown in FIGS. 8 and 9, in a top view of the cartridge holder 4, the L-section 32 is arranged in such an oblique manner that the L-section 32 is spaced away from the side surface of the magnetic head 20 on the disk cartridge insertion inlet side (the lower sides of FIGS. 8 and 9), or toward the second direction, and it approaches the side surface of the magnetic head 20 on the beam 22 side (the upper sides of FIGS. 8 and 9, or toward the first direction).

Hence, at the unloading time, the pin 26 is engaged with the U-shaped groove 30a which is the first engaging groove 30, while the second pin 27 (or distal end of the second engagement portion) is engaged with the slit groove 32a of the L-section 32 which is the second engaging groove 31. This feature substantially prevents the magnetic head 20 from being greatly vibrated when the photo-electromagnetic disk drive device is carried. Furthermore, even when vibrated, the magnetic head 20 may apply a force to the cartridge holder through the two pins 26 and 27, so that the force is dispersed, which prevents the deformation of the cartridge holder 4.

If a disk cartridge is inserted into the cartridge holder 4, the loading mechanism is driven to establish the loading state from the unloading state, and therefore, the cartridge holder 4 is first moved in the direction of the arrow A1. In this operation, the pin 26 is guided by and moved relative to the U-shaped groove 30a, while the pin 27 is guided by and moved relative to the slit groove 32a. As the pins 26 and 27 move relative to the U-shaped groove and the slit groove, respectively, a pin 33 (e.g., a fifth engagement portion) provided on the outside surface of the plate-shaped arm 21 is brought into engagement with the U-shaped groove 30a.

As shown in FIG. 9, when the pin 26 reaches the cut (space or cut out portion) 30b of the U-shaped groove 30a in association with the movement of the cartridge holder 4 in the direction of arrow A1, the pin 26 is disengaged from the latter 30a. At the same time; that is, when the first pin 26 reaches the cut 30b of the U-shaped groove 30a, the second pin 27 is also disengaged from the slit groove 32a. Both sides of the front end portion 21a are released at this time. That is, since the L-section 32 (thus the slit groove 32a) is extended obliquely, the second pin 27 is disengaged from the slit groove 32a simultaneously when the first pin 26 is disengaged from the U-shaped groove 30a.

After the cartridge holder 4 is moved in the direction of the arrow A1, the cartridge holder 4 is moved in the direction of the arrow B1 (cf. FIG. 3) as was described before. The movement of the cartridge holder 4 in the direction of the arrow B1 starts after the pins 26 and 27 are disengaged from the grooves 30a and 32a, respectively. Even if the pins 26 and 27 are disengaged, the pin 33 (e.g., or fifth engagement portion) is still engaged with the U-shaped groove 30a. Therefore, as the cartridge holder 4 moves in the direction of the arrow B1, the pin 33 is pushed against the upper wall of the U-shaped groove 30a, so that the plate-shaped arm 21 is swung towards the photo-electro-magnetic disk, and the magnetic head 20 is moved in the direction of the arrow B1. The plane through which the plate-shaped arm 21 swings defines a swinging plane. In addition, since the shutter of the disk cartridge is opened if the disk cartridge is completely inserted into the cartridge holder 4 in the direction of arrow A1, the magnetic head 20 is placed near the surface of the photo-electro-magnetic disk.

Figure 10:
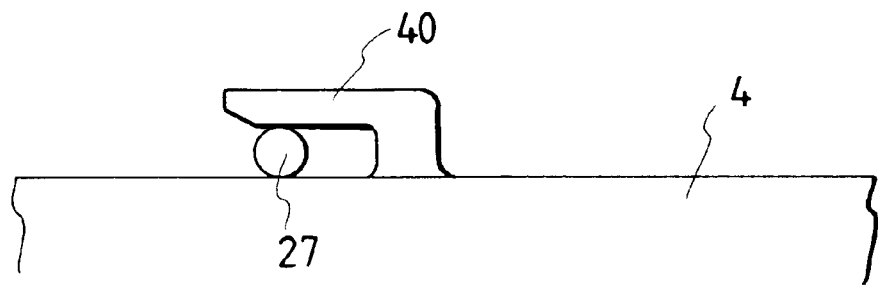
FIG. 10 is a side view of a hook member in another example of the magnetic head drive mechanism, which constitutes a second embodiment of the invention.
Figure 11:
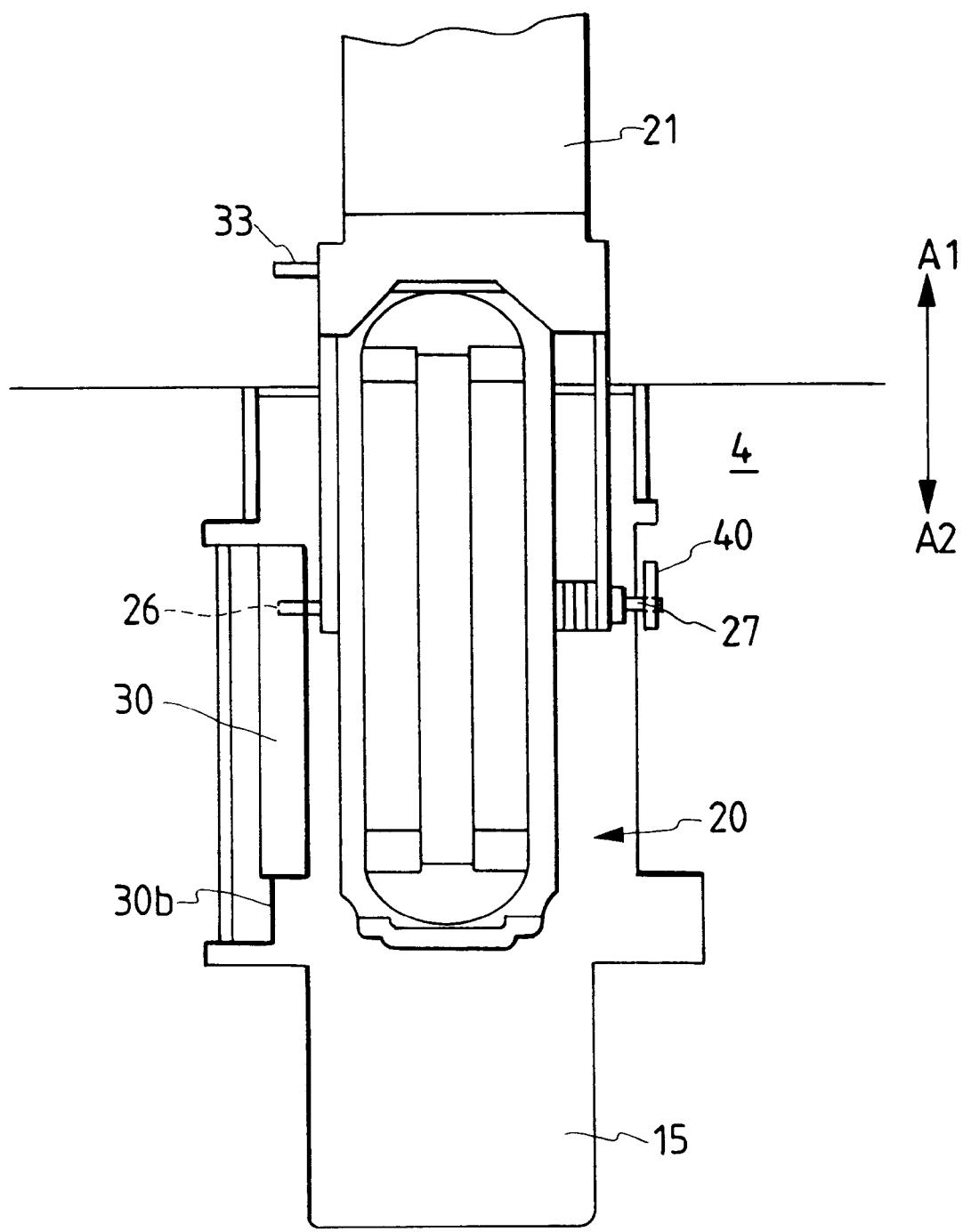
FIG. 11 is a top view of a magnetic head and a cartridge holder at the unloading time in the second embodiment.
Figure 12:
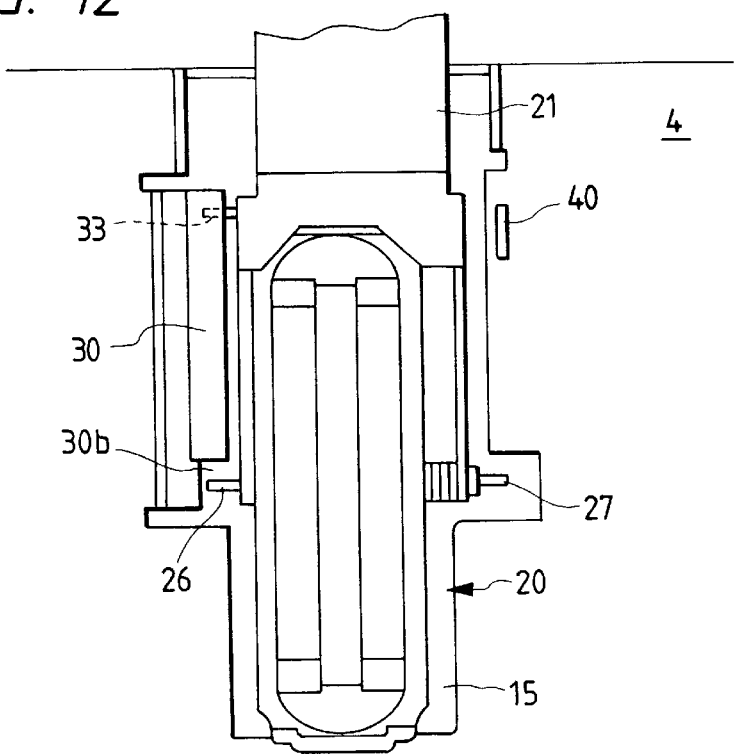
FIG. 12 is a top view of the magnetic head and the cartridge holder at the loading time in the second embodiment.

FIGS. 10 through 12 shows a second embodiment of the invention. In the second embodiment, although the first pin 26 (e.g., a first engagement portion) engages and disengages the groove 30 (e.g., a third engagement portion), instead of the slit groove 32a, a hook member 40 is formed on the cartridge holder 4. At the unloading time, the hook member 40 (e.g., a fourth engagement portion) is engaged with the second pin 27 (e.g., a second engagement portion) as shown in FIG. 11; and at the loading time, it is disengaged therefrom as shown in FIG. 12. In the second embodiment, too, both sides of the magnetic heat 20 are locked at the unloading time; that is, the second embodiment has the same effects as the above-described first embodiment.

Figure 13:
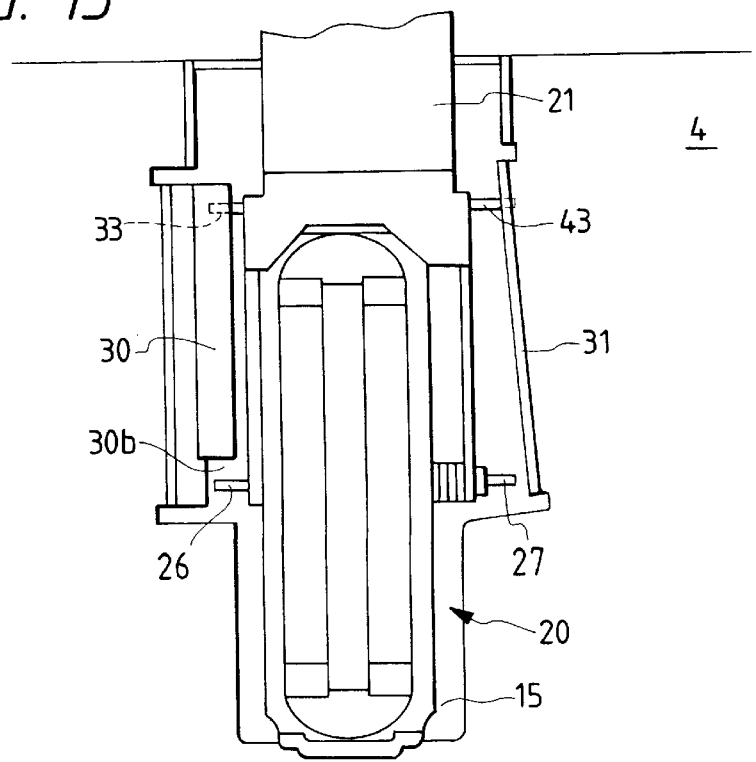
FIG. 13 is a top view of the magnetic head and the cartridge holder at the loading time in a third embodiment of the present invention.

FIG. 13 shows a third embodiment of the invention. In the third embodiment, a pin 43 is provided on the opposite outside surface of the plate-shaped arm 21. Similarly to the pin 33, the pin 43 is disengaged from the groove 32a of the L-section 32 at the unloading time, and is brought into engagement with the groove 32a as the cartridge holder 4 moves in the direction of arrow A1. As the cartridge holder 4 moves in the direction of the arrow B1, the pins 33 and 43 are pushed against the upper walls of the grooves 30a and 32a, respectively. The third embodiment can prevent the magnetic head from greatly vibrating not only at the unloading time but also the loading time.

As was described above, with the magnetic head drive mechanism of the invention, at the unloading time both sides of the magnetic head are locked to the cartridge holder. Hence, the magnetic head is prevented from being greatly vibrated when the disk is moved by the photo-electromagnetic disk drive device.

Furthermore, both sides of the magnetic head are locked to the cartridge holder. Therefore, the force of the magnetic head acting on the cartridge holder is dispersed, which prevents the deformation of the cartridge holder.

What is claimed is:

1. A magnetic head drive mechanism in a photo-electro-magnetic drive device that accepts a photo-electro-magnetic disk, comprising:

a magnetic head;

a swingable arm supporting said magnetic head, said arm being swingable in a swinging plane perpendicular to a surface of the photo-electro-magnetic disk to move said magnetic head towards or away from the surface of the photo-electro-magnetic disk as the photo-electro-magnetic disk is loaded or unloaded; and locking means for locking both sides of a front end portion of said arm at an unloading time when said arm is positioned away from a surface of the photo-electro-magnetic disk, to thereby suppress vibration of said magnetic head.

2. A magnetic head drive mechanism in a photo-electro-magnetic drive device as claimed in claim 1, further comprising a cartridge holder for accepting and loading said photo-electro-magnetic disk, wherein said locking means includes:

first and second pins respectively provided on both sides of the front end of said arm; and first and second engaging grooves provided on said cartridge holder, said first and second engaging grooves being engageable with said first and second pins, respectively.

3. A magnetic head drive mechanism in a photo-electro-magnetic drive device as claimed in claim 1, further comprising a cartridge holder for accepting and loading said photo-electro-magnetic disk, wherein said locking means includes:

first and second pins respectively provided on both sides of the front end of said arm; and an engaging groove provided on said cartridge holder, said engaging groove being engageable with said first pin; and a hook member formed on said cartridge holder, and being engageable with said second pin.

4. A magnetic head drive mechanism in a photo-electro-magnetic drive device as claimed in claim 1, further comprising:

means for releasing said locking means to unlock said both sides of the front end portion of said arm when said magnetic head drive mechanism switches from a disk unloading operation a disk loading operation.

5. A magnetic head drive mechanism in a removable read/write media drive device, said removable read/write media drive device having a cartridge holder that accepts and moves a removable read/write media between an unloading position and a loading position, said magnetic head drive mechanism comprising:

a magnetic head;

an arm supporting said magnetic head, and swingable about an axis within a swinging plane, said swinging plane defining first and second sides of said arm opposite from each other with respect to said swinging plane;

first and second engagement portions provided on said arm and distanced from said axis, said first and second engagement portions being located on said first and second sides of said arm, respectively; and third and fourth engagement portions provided on said cartridge holder, said third and fourth engagement portions of said cartridge holder being respectively located toward said first and second sides of said arm and respectively engageable with said first and second engagement portions of said arm when said cartridge holder is located at said unloading position.

6. A magnetic head drive mechanism according to claim 5, wherein said cartridge holder moves in a first direction from said unloading position to an intermediate position, and said cartridge holder moves in a second direction from said intermediate position to said loading position; and wherein each of said third and fourth engagement portions of said cartridge holder is elongated along said first direction.

7. A magnetic head drive mechanism according to claim 6, wherein said first and second engagement portions of said arm are continuously guided by said third and fourth engagement portions, respectively, when said cartridge holder is moved between said unloading position and said intermediate position.

8. A magnetic head drive mechanism according to claim 6, wherein fourth engagement portion is oblique to said swinging plane and approaches said swinging plane in said first direction.

9. A magnetic head drive mechanism according to claim 8, wherein said fourth engagement portion recedes from said swinging plane in said second direction to be farther from said swinging plane than a distal end of said second engagement portion, whereby said second engagement portion disengages from said fourth engagement portion when said cartridge holder is located at said intermediate position.

10. A magnetic head drive mechanism according to claim 6, where said third engagement portion has a cut-out portion formed therein to permit said first engagement portion to disengage from said third engagement portion when said cartridge holder is located at said intermediate position.

11. A magnetic head drive mechanism according to claim 6, further comprising:

a fifth engagement portion provided on said arm, and located closer to said first axis than said first engagement portion, said fifth engagement portion being brought into engagement with said third engagement portion before said cartridge holder reaches said intermediate position as said cartridge holder moves from said unloading position to said intermediate position.

12. A magnetic head drive mechanism according to claim 11, wherein when said cartridge holder moves from said intermediate position to said loading position, said cartridge holder swings said arm via engagement of said third engagement portion with said fifth engagement portions.

* * * * *